US008286594B2

(12) United States Patent  (10) Patent No.: US 8,286,594 B2
Smelcer  (45) Date of Patent: Oct. 16, 2012

(54) GAS FIRED MODULATING WATER HEATING APPLIANCE WITH DUAL COMBUSTION AIR PREMIX BLOWERS

(75) Inventor: Jim C. Smelcer, Hermitage, TN (US)

(73) Assignee: Lochinvar, LLC, Lebanon, TN (US)

( * ) Notice: Subject to any disclaimer, the term of this patent is extended or adjusted under 35 U.S.C. 154(b) by 1035 days.

(21) Appl. No.: 12/252,841

(22) Filed: Oct. 16, 2008

(65) Prior Publication Data

US 2010/0095905 A1 Apr. 22, 2010

(51) Int. Cl.
*F24H 9/14* (2006.01)
(52) U.S. Cl. .................... 122/13.3; 122/18.3; 122/406.1
(58) Field of Classification Search .................. 122/13.3, 122/18.3, 406.1, 406.2, 406.3, 44.1
See application file for complete search history.

(56) References Cited

U.S. PATENT DOCUMENTS

| | | |
|---|---|---|
| 108,050 A | 10/1870 | Raisbeck et al. |
| D14,883 S | 3/1884 | Arci et al. |
| 469,731 A | 3/1892 | Althouse |
| 514,338 A | 2/1894 | Row |
| 629,245 A | 7/1899 | Frank |
| 691,978 A | 1/1902 | Smith et al. |
| 770,599 A | 9/1904 | Monteagle |
| 811,016 A | 1/1906 | Whyte et al. |
| 910,192 A | 1/1909 | Grouvelle et al. |
| 951,215 A | 3/1910 | Millan |
| 1,391,871 A | 9/1921 | Volk |
| 1,448,075 A | 3/1923 | Melville |
| 1,780,110 A | 10/1930 | Bliss |
| 1,780,319 A | 11/1930 | Sonneborn |
| 1,881,610 A | 10/1932 | Hyde |
| 1,951,063 A | 3/1934 | Reimann et al. |
| 1,979,859 A | 11/1934 | Brown |
| 1,991,788 A | 2/1935 | Cartler |
| 2,162,620 A | 6/1939 | Larsen |
| 2,205,893 A | 6/1940 | Unger |
| 2,335,687 A | 11/1943 | Modine |
| 2,365,688 A | 12/1944 | Dewey |
| 2,506,120 A | 5/1950 | Turner et al. |
| 2,621,721 A | 12/1952 | Manteria |
| 3,004,330 A | 10/1961 | Wilkins |
| 3,177,936 A | 4/1965 | Walter |

(Continued)

FOREIGN PATENT DOCUMENTS

JP 57207719 12/1982

(Continued)

OTHER PUBLICATIONS

Exhibit A: "Notification of Transmittal of the International Search Report and the Written Opinion of the International Searching Authority, or the Declaration" mailing date Dec. 16, 2009.

(Continued)

*Primary Examiner* — Gregory A Wilson
(74) *Attorney, Agent, or Firm* — Waddey & Patterson, P.C.; Lucian Wayne Beavers (57) ABSTRACT

A water heating apparatus uses a low range blower assembly and a high range blower assembly, each providing a variable flow of premixed fuel and air to a burner assembly. Appropriate choice of the operating ranges of the blower assemblies can provide a high turndown ratio approximately equal to the product of the turndown ratios of each of the individual blower assemblies. Turndown ratios as high as 25:1 are achievable.

34 Claims, 5 Drawing Sheets

U.S. PATENT DOCUMENTS

| | | | |
|---|---|---|---|
| 3,486,834 A | 12/1969 | Frey et al. | |
| 3,516,773 A | 6/1970 | Rosenberg et al. | |
| 3,724,523 A | 4/1973 | Mattern | |
| 3,875,997 A | 4/1975 | Newson et al. | |
| 3,964,873 A | 6/1976 | Aramaki et al. | |
| 4,014,962 A | 3/1977 | del Notario | |
| 4,095,929 A | 6/1978 | McCartney | |
| 4,190,105 A | 2/1980 | Dankowski | |
| 4,206,806 A | 6/1980 | Togashi | |
| 4,270,470 A | 6/1981 | Barnett et al. | |
| 4,271,789 A | 6/1981 | Black | |
| 4,393,926 A | 7/1983 | Appel | |
| 4,434,112 A | 2/1984 | Pollock | |
| 4,462,342 A * | 7/1984 | Welden | 122/448.1 |
| 4,466,479 A | 8/1984 | MacLean | |
| 4,511,327 A | 4/1985 | Ogino et al. | |
| 4,548,138 A | 10/1985 | Korenberg | |
| 4,599,066 A | 7/1986 | Granberg | |
| 4,632,090 A | 12/1986 | York | |
| 4,678,116 A * | 7/1987 | Krishnakumar et al. | 236/25 A |
| 4,688,521 A | 8/1987 | Korenberg | |
| 4,723,513 A | 2/1988 | Vallett et al. | |
| 4,725,224 A | 2/1988 | Kanter | |
| 4,793,798 A | 12/1988 | Sabin | |
| 4,793,800 A | 12/1988 | Vallett et al. | |
| 4,852,524 A | 8/1989 | Cohen | |
| 4,959,009 A | 9/1990 | Hemsath | |
| 5,024,379 A * | 6/1991 | Dempsey | 237/16 |
| 5,080,577 A | 1/1992 | Bell et al. | |
| 5,099,576 A | 3/1992 | Shinmura | |
| 5,131,836 A | 7/1992 | Coppin | |
| 5,190,454 A | 3/1993 | Murray et al. | |
| 5,251,693 A | 10/1993 | Zifferer | |
| 5,311,661 A | 5/1994 | Zifferer | |
| 5,409,057 A | 4/1995 | Zifferer | |
| 5,443,040 A | 8/1995 | Kaji et al. | |
| 5,470,224 A | 11/1995 | Bortz | |
| 5,488,942 A | 2/1996 | Maughan | |
| 5,551,504 A | 9/1996 | Zifferer | |
| 5,579,832 A | 12/1996 | Le Gauyer | |
| 5,590,711 A | 1/1997 | Ishida et al. | |
| 5,644,842 A | 7/1997 | Coleman | |
| 5,839,505 A | 11/1998 | Ludwig et al. | |
| 5,881,681 A | 3/1999 | Stuart | |
| 5,915,952 A | 6/1999 | Manning et al. | |
| 5,960,870 A | 10/1999 | Takahashi et al. | |
| 5,989,020 A | 11/1999 | Glass et al. | |
| 6,082,993 A * | 7/2000 | O'Leary et al. | 431/18 |
| 6,206,687 B1 | 3/2001 | Redington | |
| 6,269,755 B1 | 8/2001 | Boswell et al. | |
| 6,283,159 B1 | 9/2001 | Tada | |
| 6,363,868 B1 | 4/2002 | Boswell et al. | |
| 6,428,312 B1 | 8/2002 | Smelcer et al. | |
| 6,435,862 B1 | 8/2002 | Fioriti et al. | |
| 6,485,289 B1 | 11/2002 | Kelly et al. | |
| 6,488,079 B2 | 12/2002 | Zifferer | |
| 6,565,361 B2 | 5/2003 | Jones et al. | |
| 6,619,951 B2 | 9/2003 | Bodnar et al. | |
| 6,659,026 B1 | 12/2003 | Hendricks et al. | |
| 6,685,462 B2 | 2/2004 | Jones et al. | |
| 6,694,926 B2 * | 2/2004 | Baese et al. | 122/14.2 |
| 6,780,008 B2 | 8/2004 | Koch et al. | |
| 6,923,035 B2 | 8/2005 | Zifferer et al. | |
| 6,941,754 B2 * | 9/2005 | Aldridge et al. | 60/524 |
| 7,044,123 B2 | 5/2006 | Rigamonti | |
| 2006/0194160 A1 | 8/2006 | Kokuo et al. | |
| 2007/0209788 A1 | 9/2007 | Jing et al. | |
| 2008/0105176 A1 | 5/2008 | Chang et al. | |
| 2008/0216771 A1 | 9/2008 | Paine | |
| 2011/0083593 A1 * | 4/2011 | Hunter et al. | 110/346 |

FOREIGN PATENT DOCUMENTS

| | | |
|---|---|---|
| JP | 58052905 | 3/1983 |
| JP | 61079914 A | 4/1986 |
| JP | 1314809 | 12/1989 |
| JP | 3263508 A | 11/1991 |
| JP | 07190484 A | 7/1995 |
| JP | 2002174420 | 6/2002 |
| JP | 2006038418 A | 2/2006 |

OTHER PUBLICATIONS

Exhibit A: Aerco Benchmark literature.
Exhibit B: Lochinvar Copper-Fin literature.

* cited by examiner

GAS FIRED MODULATING WATER HEATING APPLIANCE WITH DUAL COMBUSTION AIR PREMIX BLOWERS

BACKGROUND OF THE INVENTION

1. Field of the Invention

The present invention relates generally to gas fired water heating appliances, and more particularly, but not by way of limitation, to relatively high capacity water heating appliances having a continuously variable burner input over a wide input range thus providing a relatively high turndown ratio as compared to prior systems.

2. Description of the Prior Art

Conventional water heating appliance technology utilizes a burner designed to operate at a fixed flow rate of combustion air and fuel gas to the burner. Such an appliance cycles on and off in response to a control system which monitors the temperature of heated water in a storage tank or elsewhere in various conduits of the water supply system. One example of such a typical prior art system which is presently being marketed by the assignee of the present invention is that shown in U.S. Pat. Nos. 4,723,513 and 4,793,800 to Vallett et al., the details of which are incorporated herein by reference.

It has been recognized that, in circumstances where there is a substantially varying demand for heat input to the water supply system, greater energy efficiencies can be achieved through the use of a water heating appliance which is capable of operating at different energy inputs. One example of such a system is that sold by Lochinvar Corporation, the assignee of the present invention, under the trademark COPPER-FIN II®. The Lochinvar COPPER-FIN II® system utilizes a plurality of staged burners which can be brought on line or taken off line as the demand for heat energy changes. The COPPER-FIN II® appliance includes multiple banks, for example, first, second, third and fourth stages. It initially turns on all four stages of burners, and as it approaches the desired temperature, it sequentially shuts off units to decrease input energy. This type of system provides variable input, but it is not continuously variable. Instead the input can be changed only in substantial increments corresponding to the heat input of one burner stage.

The prior art has also included proposals for water heaters having continuously variable input over a range of inputs. Two such systems are shown in U.S. Pat. No. 4,852,524 to Cohen and U.S. Pat. No. 5,881,681 to Stuart. These systems, which have been marketed by AERCO International, Inc. under the Benchmark name, utilize a nozzle mix burner which receives independent streams of combustion air and fuel gas. A fuel/air valve is utilized to electronically and simultaneously control the flow of air through the air line and fuel through the fuel line so as to provide a varying input of fuel and air while maintaining a constant fuel to air ratio. The blower speed remains constant on these systems. The Stuart U.S. Pat. No. 5,881,681 patent suggests that the system described therein can achieve turndown ratios as high as 15:1. AERCO's advertising literature for its Benchmark model water heaters suggests that they achieve turndown ratios as high as 20:1.

More recently the assignee of the present invention has developed a continuously variable water heating appliance with variable air and fuel input, as shown in U.S. Pat. No. 6,694,926 to Baese et al. In the Baese apparatus a variable flow blower provides premix combustion air and fuel to the burner at a controlled blower flow rate within a blower flow rate range. This allows the heat input of the water heating appliance to be continuously varied within a substantial flow range having a turndown ratio of as much as 4:1.

Inherent physical limitations on the turndown ratio which can be achieved with a single heating apparatus of prior designs makes it difficult to achieve a continuous range of heat input over a large operating range from a very low low end for low heat demand situations to a very high high end for high heat demand situations. One prior solution to this difficulty is to utilize a plurality of commonly controlled heat exchangers such as those of the Baese et al. patent described above. One such system is described for example in U.S. Patent Application Publication No. 2008/0216771 of Paine et al., and assigned to the assignee of the present invention. While such multiple modulating systems do solve the problem of providing continuous modulation over a wide range of heat demands, they do so at the cost of increased complexity of plumbing to connect the multiple units and increased complexity of control systems to coordinate the operation of the units.

Thus there is a continuing need for a relatively large capacity single unit heating apparatus which can provide continuous modulation of heat input over a wide range of heat demands.

SUMMARY OF THE INVENTION

The present invention provides a water heating apparatus having a dual blower assembly, preferably a low range blower and a high range blower, feeding a common burner assembly. Through the coordinated control of the low range blower and high range blower continuous modulation of the water heating apparatus can be provided over a much wider operating range than has previously been the case. For example, utilizing conventional blower assemblies each having an inherent turndown ratio of approximately 5:1, and by choosing the operating ranges of those blower assemblies so that the lower end of the high range blower assembly is approximately equal to the high end of the low range blower assembly, the turndown ratio of the combined system is 25:1, thus far exceeding the turndown ratios achievable with typical prior art systems.

In one aspect of the present invention a water heating apparatus includes a combustion chamber and a burner assembly located within the combustion chamber. A variable flow premix low range blower assembly supplies premix fuel and air to the burner assembly within a low flow rate range extending from a low range low end to a low range high end. A variable flow premix high range blower assembly supplies premix fuel and air to the burner assembly within a high flow rate range extending from a high range low end to a high range high end. A control system is operably associated with the low range blower assembly and the high range blower assembly to selectively operate one or both of the blower assemblies as needed in response to heat demand on the water heating apparatus.

In another aspect of the present invention a water heating apparatus includes a combustion zone with a burner apparatus extending into the combustion zone. A first variable flow premix blower assembly supplies premixed fuel and air to the burner assembly. The first blower assembly has a first blower flow range extending from a first range low end to a first range high end so that the first blower assembly has a first turndown ratio at least equal to the first range high end divided by the first range low end. A second variable flow premix blower assembly supplies premixed fuel and air to the burner assembly. The second blower assembly has a second flow rate range extending from a second range low end to a second range high end so that the second blower assembly has a second turndown ratio equal to the second range high end divided by the second range low end. The second range low end is substantially equal to or less than the first range high end so that there is no substantial gap between the first and second flow rate ranges. A control system operably associated with the first and second blower assemblies selectively operates one or both of the blower assemblies as needed in response to heat demand on the heating apparatus. The first and second blower assemblies together provide a continuous combined turndown ratio at least as great as the sum of the first and second turndown ratios.

In another aspect of the present invention a method is provided for operating a water heating apparatus. Premixed fuel and air is supplied to a burner assembly of the apparatus via a low range blower assembly at a flow rate within a low flow rate range. Additional premixed fuel and air is supplied to the burner assembly via a high range blower assembly at a flow rate within a high flow rate range. The high range extends higher than the low range and there is no substantial gap between the low range and the high range. An automated control system selectively operates the blower assemblies as needed in response to heat demand on the water heating apparatus so that premixed fuel and air is supplied to the burner assembly over a substantially continuously variable flow rate range extending from a low end of the low flow rate range to at least a high end of the high flow rate range.

In still another aspect of the invention a burner assembly includes a first foraminous outer wall portion and a second foraminous outer wall portion. An interior wall separates first and second interior zones adjacent the first and second foraminous outer wall portions, respectively. A first fuel and air inlet passage communicates with the first interior zone. A second fuel and air inlet passage communicates with the second interior zone.

In another aspect of the present invention a water heating apparatus includes a primary non-condensing heat exchange section having a heat exchange wall formed of carbon steel. The heat exchanger includes a hot gas chamber and a water or liquid chamber separated by the heat exchange wall. A burner is communicated with the hot gas chamber. A primary variable flow blower is communicated with the burner for supplying premixed combustion air and fuel to the burner at a controlled blower flow rate within a blower flow rate range. A sensor is provided for detecting a parameter related to possible condensation of combustion gases within the hot gas chamber. A supplemental blower is communicated with the burner. A control system is operable to activate the supplemental blower to provide supplemental air to the burner in response to the sensed parameter so as to prevent condensation of combustion gases on the carbon steel heat exchange wall.

In another aspect of the present invention a water heating apparatus includes a combustion chamber and a burner assembly extending into the combustion chamber. The burner assembly includes a foraminous outer burner wall. First and second modulating premix blower assemblies provide premixed fuel and air to the burner assembly. A control system is operably associated with the blower assemblies for selectively operating one or both of the blower assemblies in response to heat demand on the water heating apparatus over a continuously modulated turndown ratio of at least 25:1.

Accordingly it is an object of the present invention to provide a water heating apparatus having a high turndown ratio.

Another object of the present invention is the provision of a high capacity water heating apparatus which is continuously modulated over a large range of inputs.

Another object of the present invention is the provision of a water heating apparatus having a burner assembly and having a low range blower assembly providing fuel and air to the burner assembly within a low flow rate range, and having a high range blower assembly providing fuel and air to the burner assembly within a high flow rate range.

Another object of the present invention is to provide a water heating apparatus having the ability to supply supplemental air to a burner to prevent condensation of combustion gases.

Another object of the present invention is the provision of a water heating apparatus having dual blowers feeding a single burner assembly, with safety systems for preventing backflow of combustion gases into either one of the blower assemblies.

Another object of the present invention is the provision of a single water heating apparatus having a turndown ratio of at last 25:1.

And another object of the present invention is the provision of a dual chamber burner assembly for use with a dual blower system.

And another object of the present invention is the provision of methods of operating water heating apparatus utilizing dual blower assemblies.

And another object of the present invention is the provision of a high capacity water heating apparatus capable of utilizing direct spark ignition.

Other and further objects, features and advantages of the present invention will be readily apparent to those skilled in the art upon a reading of the following disclosure when taken in conjunction with the accompanying drawings.

DETAILED DESCRIPTION OF THE INVENTION

Figure 1:
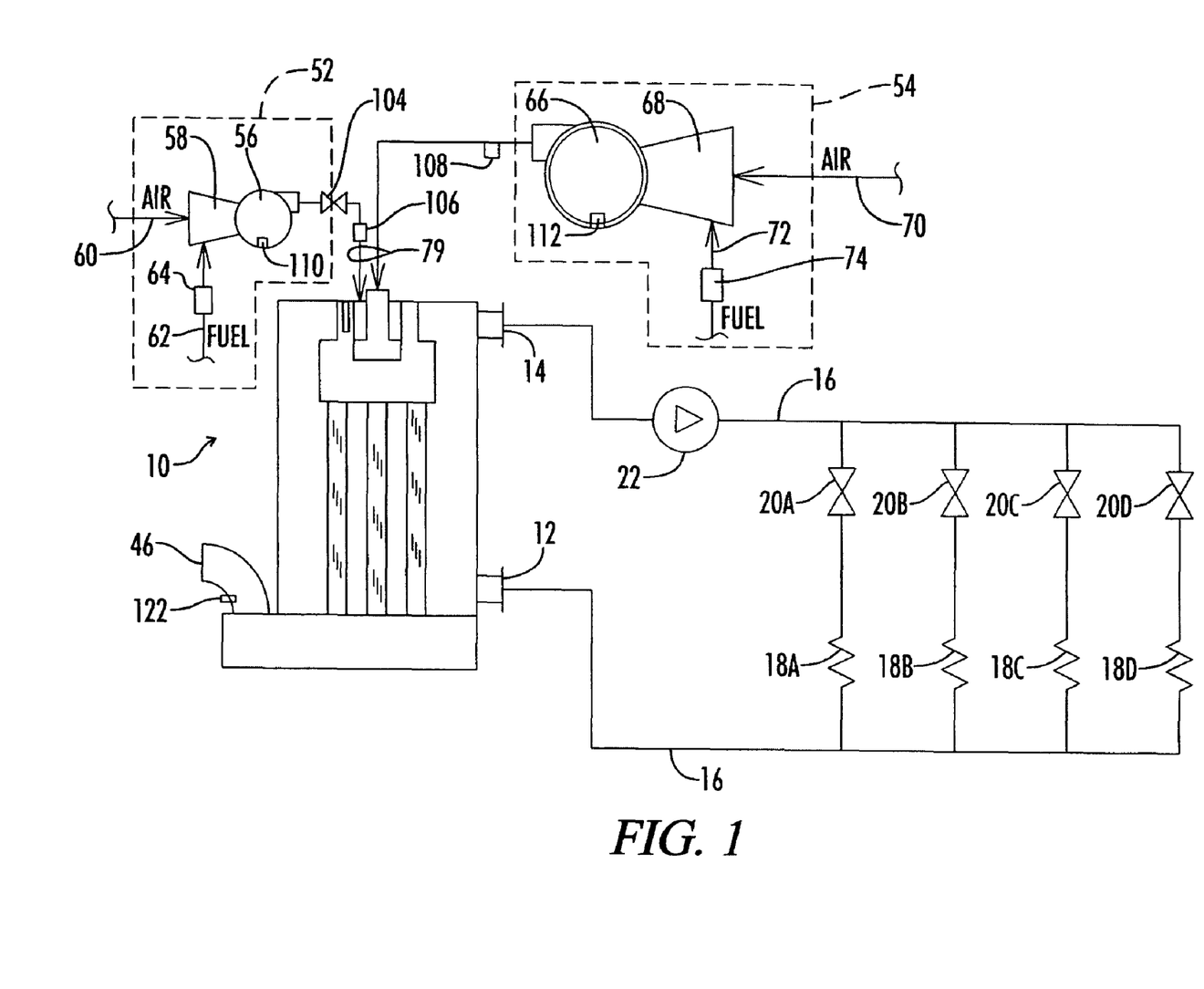
FIG. 1 is a schematic illustration of a water heating apparatus having a dual blower system including a low range blower assembly and a high range blower assembly.

Referring now to the drawings, and particularly to FIG. 1, a water heating apparatus is shown and generally designated by the numeral 10. As used herein, the terms water heating apparatus or water heating appliance or water heater apparatus or water heater all are used interchangeably and all refer to an apparatus for heating water, including both hot water boilers and water heaters that do not actually "boil" the water. Such apparatus are used in a wide variety of commercial and residential applications including potable water systems, space heating systems, pool heaters, process water heaters, and the like. Also, the water being heated can include various additives such as antifreeze or the like.

The water heating apparatus 10 illustrated in FIG. 1 is a fire tube heater. A fire tube heater is one in which the hot combustion gases from the burner flow through the interior of a plurality of tubes. Water which is to be heated flows around the exterior of the tubes. The operating principles of the present invention are equally applicable, however, to water heaters having the water flowing through the interior of the tubes and having the hot combustion gases on the exterior of the tubes, such as for example the design shown in U.S. Pat. No. 6,694,926 to Baese et al. discussed above.

The water heating apparatus 10 shown in FIG. 1 is connected to a heat demand load in a manner sometimes referred to as full flow heating wherein a water inlet 12 and water outlet 14 of the heating apparatus 10 are directly connected to a flow loop 16 which carries the heated water to a plurality of loads 18A, 18B, 18C and 18D. The loads 18A-18D may, for example, represent the various heating loads of heat radiators contained in different areas of a building. Heat to a given area of the building may be turned on or off by controlling zone valves 20A-20D. Thus as a radiator is turned on and off or as the desired heat is regulated in various zones of the building, the water flow permitted to that zone by zone valve 20 will vary, thus providing a varying water flow through the flow loop 16 and a varying heat load on the heating apparatus 10. A supply pump 22 in the flow loop 16 circulates the water through the system. The operating principles of the present invention are, however, also applicable to heating apparatus connected to other types of water supply systems, such as for example a system using a primary flow loop for the heat loads, with the water heating apparatus being in a secondary flow loop so that not all of the water circulating through the system necessarily flows back through the water heater. An example of such a primary and secondary flow loop system is seen in U.S. Patent Application Publication No. 2008/0216771 of Paine et al., filed Mar. 9, 2007 and entitled "Control System for Modulating Water Heater", and assigned to the assignee of the present invention, the details of which are incorporated herein by reference.

The apparatus 10 includes an outer jacket 24. The water inlet 12 and water outlet 14 communicate through the jacket 24 with a water chamber 26 or water side 26 of the heat exchanger. In an upper or primary heat exchanger portion 28, an inner heat exchange wall or inner jacket 30 has a combustion chamber or combustion zone 32 defined therein. The lower end of the combustion chamber 32 is closed by an upper tube sheet 34. A plurality of fire tubes 36 have their upper ends connected to upper tube sheet 34 and their lower ends connected to a lower tube sheet 38. The fire tubes extend through a secondary heat exchanger portion 40 of the heat exchanger apparatus 10.

A burner assembly or burner apparatus 42 is located within the combustion chamber 32. The burner assembly 42 burns premixed fuel and air within the combustion chamber 32. The hot gases from the combustion chamber 32 flow down through the fire tubes 36 to an exhaust collector 44 and out an exhaust flue 46.

Water from flow loop 16 to be heated flows in the water inlet 12, then around the exterior of the fire tubes 36 and up through a secondary heat exchanger portion 48 of water side 26, and continues up through a primary heat exchanger portion 50 of water side 26, and then out through water outlet 14. It will be appreciated that the interior of the apparatus 10 includes various baffles for directing the water flow in such a manner that it generally uniformly flows around all of the fire tubes 36 and through the water chamber 50 of primary heat exchanger 28 between the outer jacket 24 and inner jacket 30. As the water flows upward around the fire tubes 36 of the secondary heat exchanger 40 the water is heated by heat transfer from the hot combustion gases inside of the fire tubes 36 through the walls of the fire tubes 36 into the water flowing around the fire tubes 36. As the heated water continues to flow upward through the water side 50 of primary heat exchanger 28 additional heat is transferred from the combustion chamber 32 through the inner jacket 30 into the water contained in water side 50.

The Dual Blower Assemblies

Referring again to FIG. 1, first and second blower assemblies 52 and 54, respectively, are connected to the burner apparatus 42 for supplying premixed fuel and air to the burner assembly 42. Each of the blower assemblies is a variable flow premix blower assembly.

The first blower assembly 52 includes a variable flow blower 56 driven by a variable frequency drive motor. A venturi 58 is provided for mixing combustion air and fuel gas. An air supply duct 60 provides combustion air to the venturi 58. A gas supply line 62 provides fuel gas to the venturi 58. A gas control valve 64 is disposed in supply line 62 for regulating the amount of gas entering the venturi 58. The gas control valve 64 includes an integral shutoff valve. In some embodiments the gas control valve and the venturi may be combined into a single integral unit. The gas control valve is preferably a ratio gas valve for providing fuel gas to the venturi 58 at a variable gas rate which is proportional to the negative air pressure within the venturi caused by the speed of the blower, hence varying the flow rate entering the venturi 58, in order to maintain a predetermined air to fuel ratio over the flow rate range within which the blower 56 operates. In order to provide the variable input operation of the burner assembly 42, the variable flow blower 56 delivers the premixed combustion air and fuel gas to the burner assembly 42 at a controlled blower flow rate within a first blower flow rate range extending from a first range low end to a first range high end. Thus the first blower assembly 52 has a first turndown ratio at least equal to the first range high end divided by the first range low end.

Similarly, the second blower assembly 54 includes variable speed blower 66, venturi 68, air supply duct 70, gas supply line 72 and gas valve 74. The second blower assembly 54 supplies premixed fuel and air to the burner assembly 42 and has a second flow rate range extending from a second range low end to a second range high end so that the second blower assembly has a second turndown ratio equal to the second range high end divided by the second range low end.

Although in the embodiment illustrated the first and second blower assemblies 52 and 54 include completely separate fuel air mixing devices, namely their venturis 58 and 68, it is conceivable to develop a system in which the two blower assemblies would draw premixed fuel and air from a common mixing device.

In a preferred embodiment of the invention the first and second blower assemblies 52 and 54 are low range and high range blower assemblies, respectively, with the second range low end being substantially equal to the first range high end. With that arrangement the continuous combined turndown ratio of the two blower assemblies is at least as great as the product of the first turndown ratio multiplied times the second turndown ratio. For example, if the first or low range blower assembly 52 has a low range low end corresponding to an 80,000 BTU/hr heat input and a low range high end corresponding to a 400,000 BTU/hr heat input, it has a first turndown ratio of 5:1. And if the second or high range blower assembly 54 has a high range low end corresponding to a 400,000 BTU/hr heat input and a high range high end corresponding to a 2,000,000 BTU/hr heat input, then the second turndown ratio is also 5:1. Thus in the example just given the continuous combined turndown ratio from 80,000 BTU/hr to 2,000,000 BTU/hr is 25:1 which is at least as great as the product of the first turndown ratio multiplied times the second turndown ratio. As noted in the example just given, it is conventional in the heater industry to describe the input of a heating apparatus in terms of heat energy per unit time consumed by the burner, i.e. the heat energy of the combustion gas burned in the burner. Thus it is conventional to also describe the volumetric output per unit time or flow rate range of the blower as corresponding to the heat input rating of the heating apparatus.

The benefits of the present invention can also be achieved to a lesser degree, however, with first and second blower assemblies whose flow rate ranges to some degree or even entirely overlap.

Thus for example the first and second blower assemblies 52 and 54 could have substantially equal flow rate ranges in which case the continuous combined turndown ratio is substantially equal to the sum of the first and second turndown ratios.

Or, more generally, if there is partial but incomplete overlap of the first and second flow rate ranges the continuous combined turndown ratio will be something less than the product of the first turndown ratio multiplied times the second turndown ratio, and something greater than the sum of the first and second turndown ratios.

It is desirable, however, that there be no substantial gap between the first and second flow rate ranges. Thus the second range low end should be substantially equal to or less than the first range high end.

Figure 2:
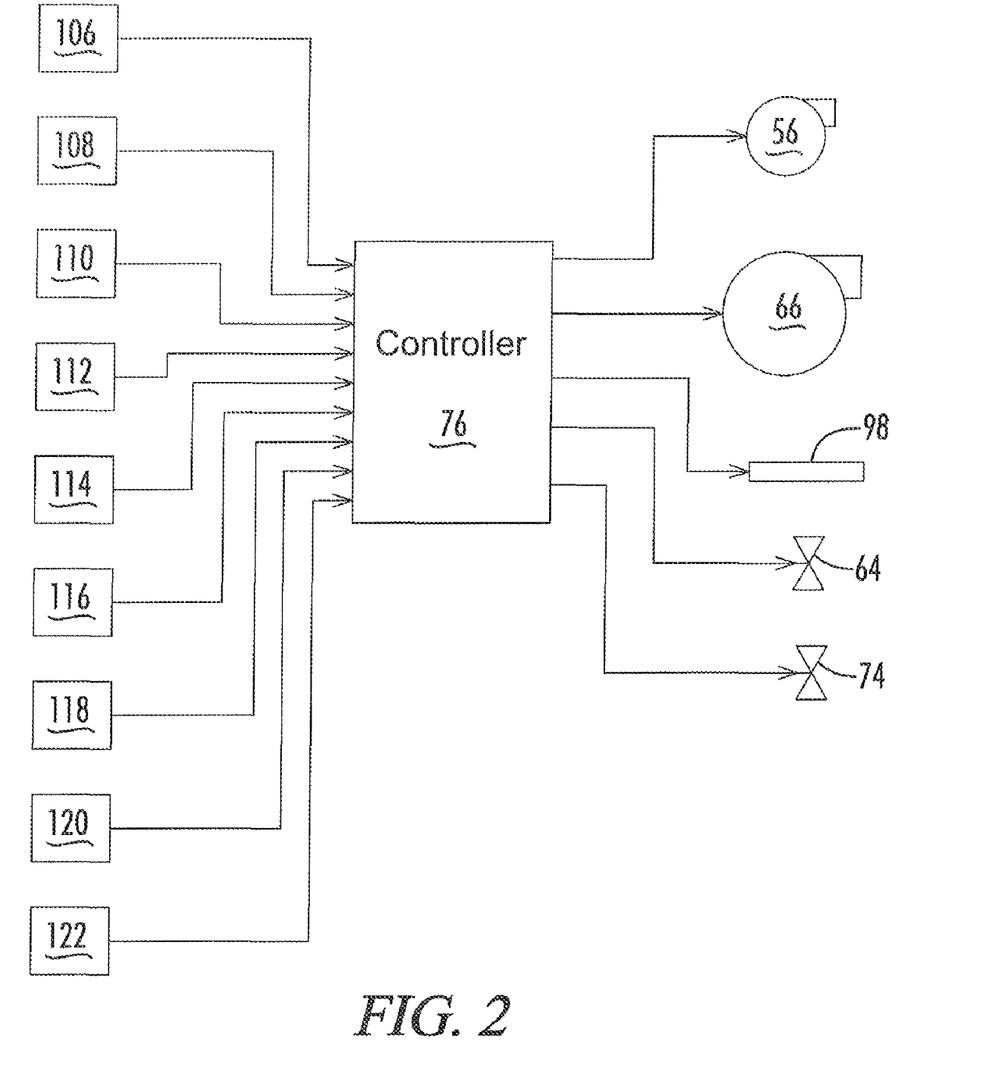
FIG. 2 is a schematic illustration of the control system for the heating apparatus of FIG. 1.

As schematically illustrated in FIG. 2, the apparatus 10 includes a control system 76 operably associated with the first and second blower assemblies 52 and 54 to selectively operate one or both of the blower assemblies as needed in response to heat demand on the heating apparatus 10. The control system 76 causes the first and second blower assemblies 52 and 54 to supply premixed fuel and air to the burner assembly 42 in a continuously variable combined flow rate range extending from the first range low end to at least the second range high end. In the preferred embodiment where the first blower assembly 52 is a low range blower assembly 52 and the second blower assembly 54 is a high range blower assembly 54, the control system supplies fuel and air in a continuously variable combined flow rate range extending from the low range low end to at least the high range high end. Preferably the high range high end is at least 25 times the low range low end thus providing a 25:1 turndown ratio. This can be accomplished by choosing low and high range blower assemblies 52 and 54 having contiguous but substantially non-overlapping flow rate ranges wherein each of the blower assemblies has a 5:1 turndown ratio.

For example, an apparatus 10 having a maximum heat input of approximately 2,000,000 BTU/hr may utilize the following components. In the low range blower assembly 52 the variable speed blower 56 may be a model RG148 or its redesigned enhanced equivalent RG137 blower available from EBM Industries. The venturi and gas valve may be a combination venturi/gas valve model VR8615V available from Honeywell. In this series of components the first blower assembly 52 can provide a low flow rate range from a low range low end corresponding to a heater input of approximately 80,000 BTU/hr to a low range high end corresponding to a heater input of approximately 400,000 BTU/hr. In this example, the high range blower assembly 54 may include a variable speed blower 66 which is a model G3G200 blower available from EBM Industries. The venturi 68 may be a model VMU680A available from Honeywell. The gas valve 74 may be a model VR4734C available from Honeywell. With this combination of components the second blower assembly 54 can provide a high flow rate range extending from a high range low end corresponding to a heater input of approximately 400,000 BTU/hr to a high range high end corresponding to a heater input of approximately 2,000,000 BTU/hr.

It is noted that in the example just described the high range blower assembly includes one and only one blower 66. It is also possible for the high range blower assembly to be made up of a plurality of smaller blowers connected in parallel to provide the desired blower output. Such an arrangement of smaller blowers manifolded together may in some situations be desirable from a practical standpoint due to the availability and lower cost of the smaller variable speed blowers.

The Burner Assembly

Figure 4:
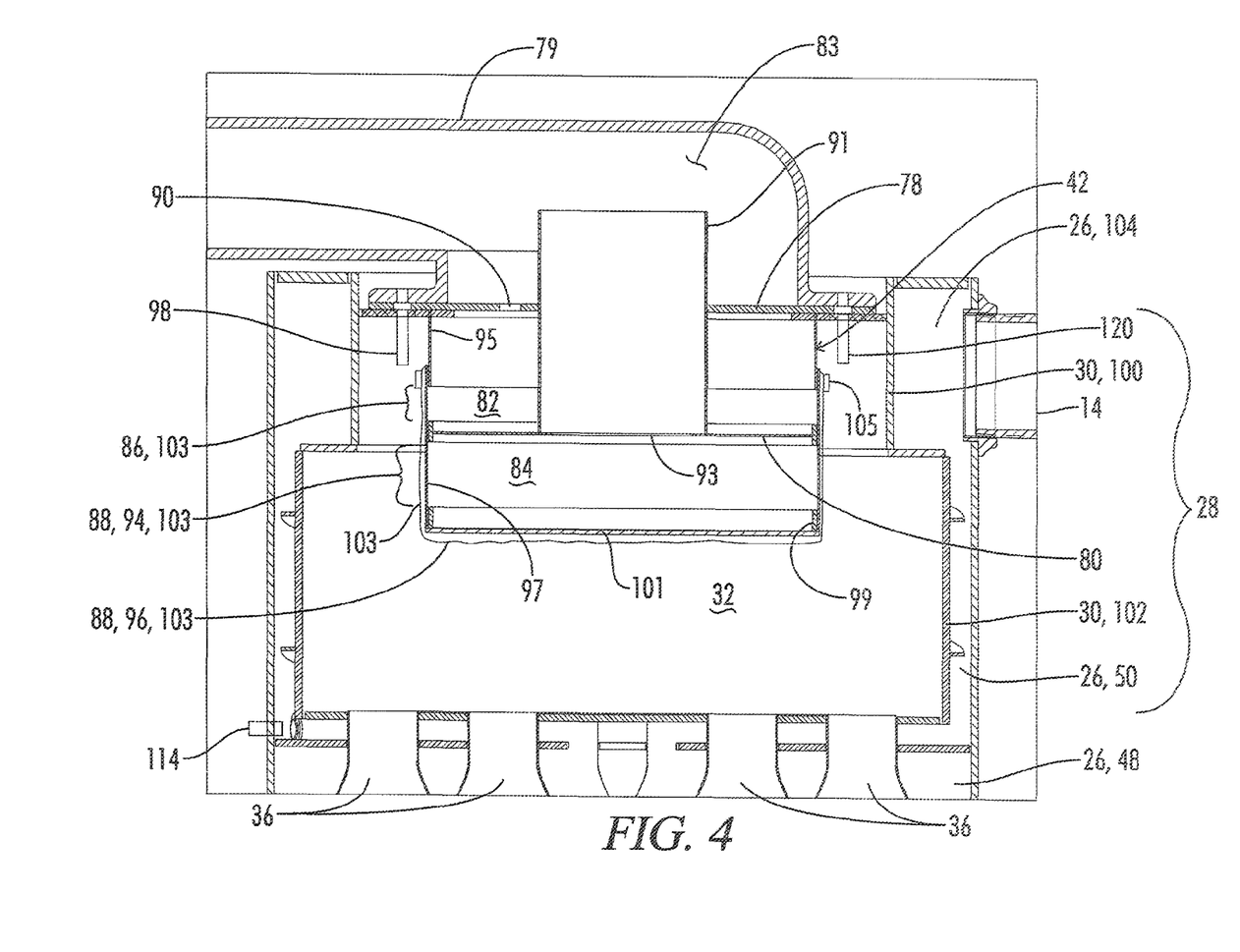
FIG. 4 is an enlarged elevation cross-section view of the burner assembly and surrounding heat exchanger structure of the apparatus of FIG. 3.

Referring now to FIG. 4 the details of construction of the burner assembly 42 are best seen. The burner assembly 42 is generally cylindrical in shape and extends into the combustion chamber 32 of the primary heat exchanger section 28. Burner assembly 42 includes a header wall 78 and an interior wall 80 spaced from the header wall 78. The interior wall separates first and second or upper and lower interior zones or plenums 82 and 84.

Figure 5:
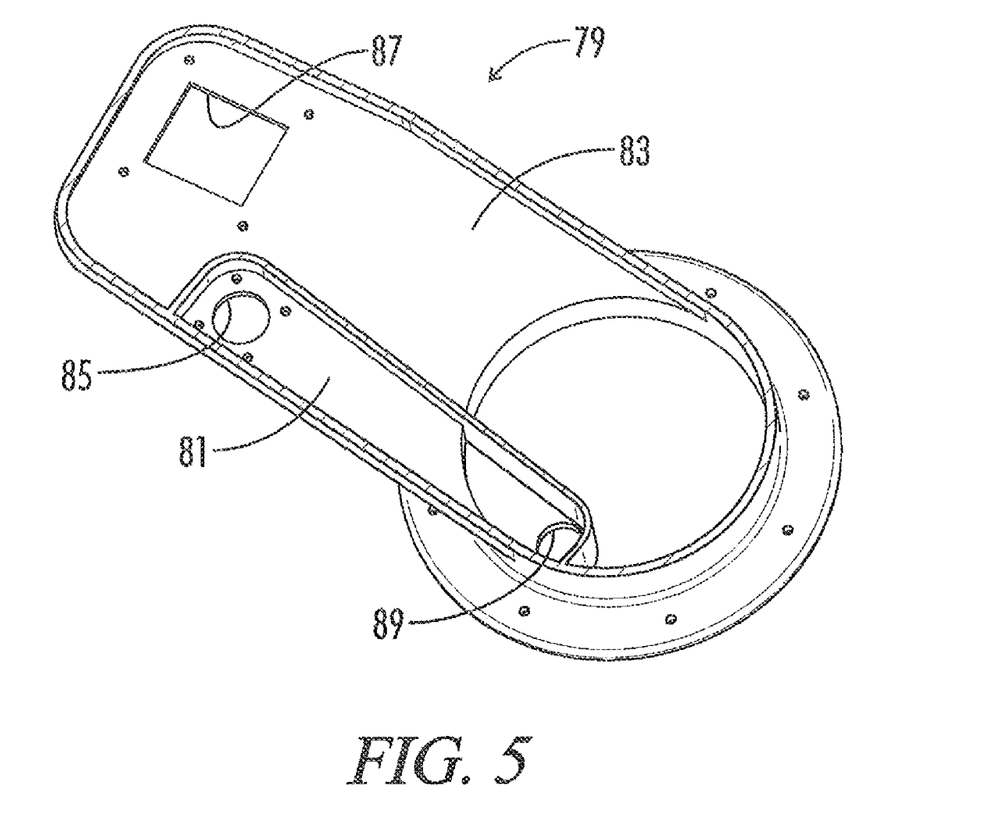
FIG. 5 is a cross-section view taken along line 5-5 of FIG. 3 showing internal details of a blower transition manifold.

A blower transition manifold 79 is attached to the header wall 78 and connects the outlets of blower assemblies 52 and 54 to the burner assembly 42. As best seen in FIG. 5, first and second passageways 81 and 83, respectively, are defined in the transition manifold 79.

The outlet of first blower 56 is connected to inlet 85 of first passage 81. The outlet of second blower 66 is connected to second inlet 87. Check valves such as 104 (see FIG. 1) may be placed between the blowers and their respective manifold inlets.

First passage 81 has a passage outlet 89 which aligns with an opening 90 in header wall 78, so that the output of first blower 56 is communicated to first zone 82. It is noted that FIG. 4 is shown somewhat schematically and that the opening 90 is rotated 90° from its actual position in header wall 78.

A duct 91 extends between divider wall 80 and header wall 78 and extends upward into the second passage 83. Duct 91 is welded or otherwise attached to header wall 78 and divider wall 80. The lower end of duct 91 communicates through opening 93 in divider wall 80 with the second zone 84, and defines a passage communicating second blower 66 with second zone 84.

The burner apparatus 42 further includes an upper neck or collar 95 attached to and extending downward from header wall 78. A perforated cylindrical support screen 97 is attached to collar 95 and divider wall 80. A lower support ring 99 is received in the lower end of support screen 97. A flat lower burner screen 101 is attached to and spans across ring 99. The header wall 78, neck 95, duct 91, divider wall 80, support screen 97, support ring 99, and bottom screen 101 are all preferably constructed of metal and welded together to form a structural skeleton of the burner assembly 42.

A foraminous outer sock 103 is received about the cylindrical screen 97 and bottom screen 101 and held in place by a retaining band 105.

First and second foraminous outer wall portions 86 and 88 of sock 103 are located adjacent the first and second interior zones 82 and 84, respectively. The second foraminous outer wall portion 88 includes both a cylindrical portion 94 and an end portion 96 which spans the bottom screen 101. The foraminous material from which the sock 103 is constructed may for example be a ceramic fiber weave material manufactured by 3M Company. The cylindrical portion 94 of second foraminous outer wall portion 88 and the first foraminous outer wall portion 86 may comprise a continuous cylindrical foraminous burner wall.

As is further described below, it is preferable to design the burner assembly 42 to match the capacities of the first and second blower assemblies 52 and 54 so as to provide a substantially uniform surface loading on the burner. That is, the amount of heat energy being generated per square inch of surface area of the burner should be uniform for uniform heating. Thus, if at maximum output the high range high end of the high range blower assembly is to be five times the low range high end of the low range blower assembly, then the surface area of the second foraminous outer wall portion 88 including both portions 94 and 96 thereof should be approximately five times the external surface area of the first foraminous outer wall portion 86. More generally, it can be stated that the external surface area of the second foraminous outer wall portion 88 in that example should be in the range of from four to six times the external surface area of the first foraminous outer wall portion 86.

The combustion chamber 32 is a relatively tight combustion chamber in that it relatively closely confines the burner assembly 42 as compared to many other types of prior art burner arrangements. The design of the burner assembly 42 and its tightly confined combustion chamber 32 allows the foraminous outer walls of the burner assembly 42 to carry very high specific loadings for high energy input. As used herein the term "specific loading" is referring to the power per unit of surface area of the foraminous outer wall portions. Where typical prior art burner devices might have a specific loading of 2,500 $BTU/in^2$ hr to 3,600 $BTU/in^2$ hr, the burner assembly 42 of the present invention may utilize specific loadings as high as 5,600 $BTU/in^2$ hr.

The apparatus 10 preferably utilizes a direct spark ignition element 98 extending downward into the combustion chamber 32 to a location adjacent the exterior of the first foraminous outer wall portion 86 so that when the operation of the apparatus 10 is first initiated, and premixed fuel and air are flowing only from the low range blower assembly 52, the fuel and air mixture exiting the first foraminous outer wall portion 86 can be ignited by the direct spark ignition element 98 located adjacent thereto.

In the construction illustrated in FIG. 4, the first and second foraminous outer wall portions 86 and 88 are separated only by the thickness of the interior wall 80 and are sufficiently close to each other so that flame from the first foraminous burner wall portion 86 will subsequently ignite fuel and air mixture exiting the second foraminous burner wall portion 88. Thus only a single direct spark ignition device 98 is needed. Also only a single flame detector 120 is needed.

It will be appreciated that due to the presence of the interior wall 80 there will be a small gap between the exterior burner surfaces associated with the first zone 82 and second zone 84 of the burner assembly 42. When the heating apparatus 10 is first fired up, with only the low range blower assembly 52 providing fuel to the burner assembly 42, there will only be flame on the exterior surface 86 of the first zone 82. Hot combustion gases will be flowing downward past the outer surface 94 of second zone 84 and upon actuation of the second blower assembly 54 those hot gases will ignite fuel being provided by high range blower assembly 54. Although the physical gap created by divider wall 80 is preferably kept to a minimum, it will be appreciated that so long as the foraminous outer surface 94 is sufficiently close to foraminous outer surface 86 that the gases exiting the second zone 84 can be ignited, then the apparatus 10 can operate with only the single direct spark ignition element 98 initially igniting the flame from first zone 82. Although in the embodiment illustrated the physical gap created by interior wall 80 is on the order of one inch, it is expected that a gap of several inches, perhaps as much as six inches, could be accommodated and the fuel exiting second zone 84 could still be ignited by hot gases flowing downward from the flames exiting first zone 82. Although it is preferred for practical reasons that the burner assembly 42 be an integrally constructed burner assembly, it is conceivable to completely physically separate the burner surfaces associated with the first and second blower assemblies 52 and 54 so long as they are feeding a common combustion zone 32 and are sufficiently close that second burner surface 88 can take ignition from flame from first burner surface 86, and so long as the design prevents physical damage from occurring to the neighboring burner.

It will be appreciated by those skilled in the art that in accordance with various industry design standards, the use of direct spark ignition elements are typically limited to relatively small heating apparatus having relatively low fuel flow rates. This is because typical standards require that there be a "trial for ignition period" of for example 4 seconds during which fuel must flow before ignition. In larger heating apparatus, particularly those providing over, for example, 400,000 BTU/hr, a 4 second flow period prior to ignition involves a substantial amount of fuel and can result in a "hard start" due to the volume of gas present upon ignition. With the heating apparatus 10 of the present invention, however, utilizing a low range blower assembly and a high range blower assembly, the advantages of the use of direct spark ignition can be enjoyed since the low range blower assembly will ignite like a typical lower range water heating apparatus, and then the high range blower assembly 54 can take its ignition from the previously ignited low range blower assembly without going through a "trial for ignition period" on the high range blower assembly.

Figure 3:
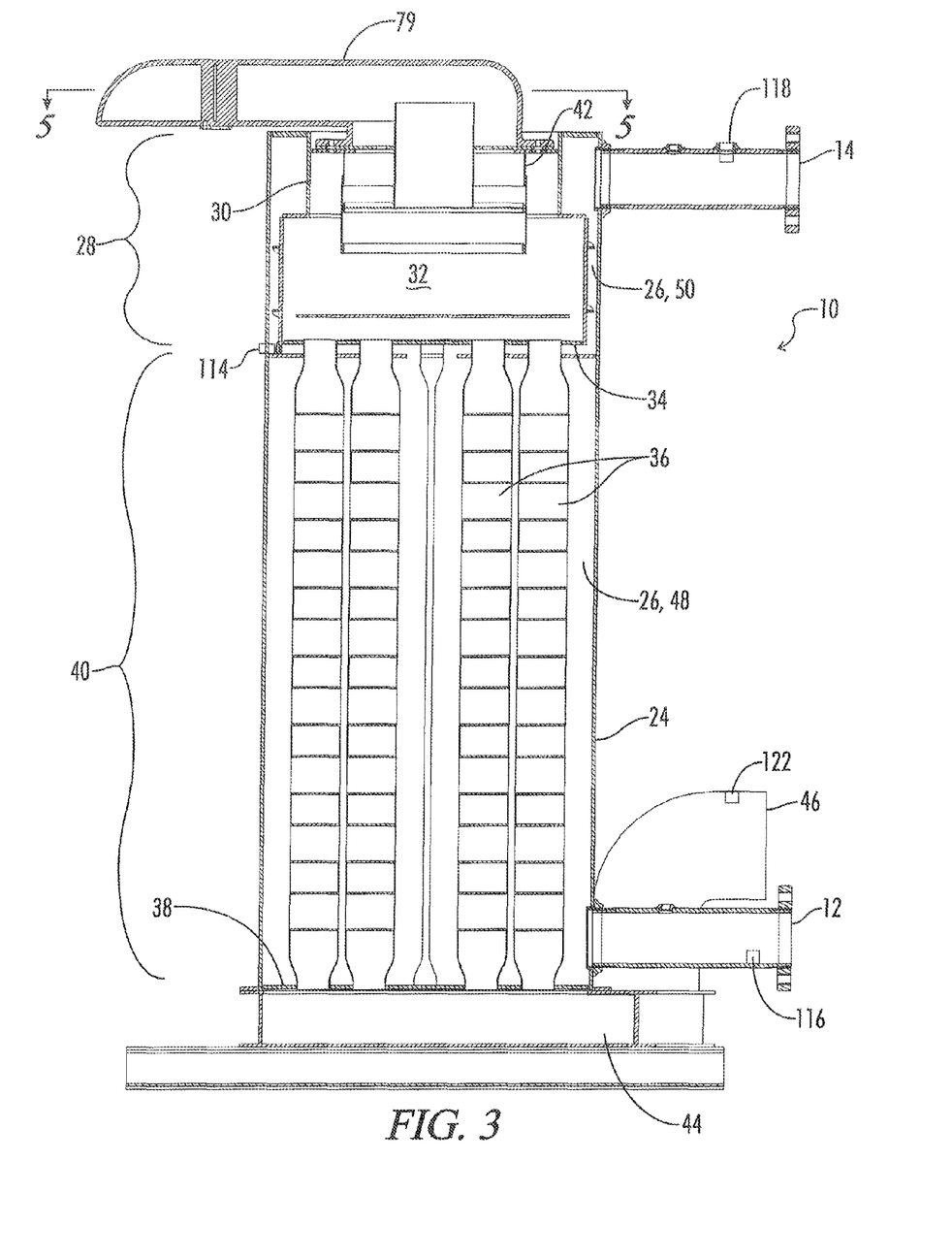
FIG. 3 is an elevation cross-section view of the water heating apparatus of FIG. 1.

As can be seen in FIGS. 3 and 4 the inner jacket or heat exchanger wall 30 which defines the combustion chamber 32 therewithin is made up of a first smaller diameter portion 100 and a second larger diameter portion 102. The first zone 82 of burner assembly 42 is located within the smaller diameter portion 100, and the second zone 84 is located within the larger diameter portion 102. Thus the radial spacing from the first foraminous outer wall portion 86 to smaller diameter heat exchanger wall portion 100 is less than the radial spacing between the second cylindrical foraminous outer wall portion 94 and the larger diameter heat exchanger wall portion 102. This provides improved heat transfer for the burner assembly 42 when it is operating in its low range with just the low range blower assembly 52 providing fuel air mixture to the burner assembly 42 through the first zone 82. The flame from the first foraminous outer wall portion 86 is relatively close to the smaller diameter heat exchanger wall portion 100 and thus transfers heat relatively directly thereto. Thus the flame from the first zone 82 fed by the low range flow assembly 52 has a shorter standoff from the reduced diameter portion 100 of heat exchanger wall 30 than does flame from the second zone 84 fed by the high range flow assembly 54 which has a greater standoff distance from the larger diameter portion 102 of heat exchanger wall 30.

Also, this staggered construction of the inner jacket 30 increases the radial width of an uppermost portion 104 of the water chamber 26 adjacent to the water outlet 14. This aids in providing uniform upward flow of water through the water zone 50 around the entire circumference of the inner jacket 30.

Safety Features

The use of dual blower assemblies each feeding premixed fuel and air to a common burner assembly in a common combustion chamber requires that precautions be taken to prevent the occurrence of backflow of hot combustion gases from the combustion chamber 32 into one of the blower assemblies.

This is particularly important with regard to the small blower assembly 52 which due to its relatively small size could be easily overcome and destroyed by the high volume of hot combustion gases which could backflow from the operation of the large blower assembly 54. Three different safety features may be provided to prevent such backflow with regard to the small blower assembly 52. The same three features may also be provided on the large blower assembly 54.

One manner of preventing backflow into the low range blower assembly 52 is the provision of a mechanical check valve 104 on the discharge of the blower 56. The mechanical check valve can be a flapper type valve that when properly operating will mechanically prevent flow back into the blower 56 while permitting flow out of the blower 56. Although not shown in FIG. 1, a similar mechanical check valve could be provided on the discharge of the large blower 66.

A second means for preventing such backflow is the provision of a temperature sensor 106 in the ducting between blower 56 and burner assembly 42, which temperature sensor can detect the increased heat if hot combustion gases were to backflow toward the blower 56. As is schematically illustrated in FIG. 2, the temperature sensor 106 is communicated with the control system 76, and the control system 76 is operable to shut down the heating apparatus 10 in response to detection of backflow into the low range blower assembly 52 via the temperature sensor 106. A similar temperature sensor 108 can be provided between the high range blower assembly 54 and the burner assembly 42.

Still another means for detecting and preventing backflow into either of the blower assemblies is the provision of speed sensors 110 and 112 associated with the blowers 56 and 66, respectively, so as to detect blower fan speed. It will be appreciated that during normal operation of the water heating apparatus 10 the control system 76 is sending operating signals to the variable speed drive motors of the blowers 56 and 66, and thus the control system 76 is instructing each of the blowers 56 and 66 to operate at a programmed speed dependent upon the heat demand and the control scenario being utilized by the control system 76. Thus the control system 76 knows what the blower fan speed of each blower 56 and 66 should be at any given point in time. If the controller 76 detects an aberration in the actual blower fan speed of either blower via speed sensors 110 and 112, the controller 76 can shut down the heating apparatus 10. Such an unexpected blower fan speed may be either an overspeed or an underspeed dependent upon various forms of malfunction of the system, but in any event if the blower fan speed differs substantially from what speed is programmed, then the control system 76 can shut down the heating apparatus 10, or can send an appropriate warning signal to call an operator to determine what action should be taken.

Supplemental Air Feature

The water heating apparatus 10 may be designed such that the primary heat exchanger portion 28 is a non-condensing heat exchanger, i.e. the water vapor in the hot combustion gases should not condense within the confines of the combustion chamber 32. The secondary heat exchanger portion 40 is designed to be a condensing heat exchanger and thus the moisture contained in the hot combustion gases may condense on the inside of the fire tubes 36. As will be appreciated by those skilled in the art, a condensing heat exchanger section in which condensation of moisture is expected mandates that that portion of the heat exchanger be made of material such as stainless steel which will not corrode due to the presence of moisture.

Thus according to the intended operating parameters of the apparatus 10, the operating temperatures at various points within the apparatus 10 should be such that there is no condensation of water from the hot combustion gases within the combustion chamber 32. Condensation of water can occur in the interior of the fire tubes 36.

So long as it can be insured that there is no condensation within the combustion chamber 32, the inner heat exchange jacket 30 can be made of carbon steel, whereas the fire tubes 36 should be made from stainless steel. As will be understood by those skilled in the art, stainless steel is much more corrosion resistant when exposed to condensed water. The carbon steel, on the other hand, will corrode if exposed to water, but has many preferable characteristics such as reduced cost and increased heat transfer capacity as compared to stainless steel. Thus, where operating conditions allow, the use of carbon steel may be preferable.

The circumstance which must be monitored to prevent condensation in primary heat exchanger 28 is to make certain that the walls of the inner jacket or heat exchange wall 30 stay at a temperature above the dew point of the condensate water vapor in the hot combustion gases in combustion chamber 32. This can be insured by making certain that the water temperature of the water flowing upward through water side 26 just prior to the time it enters the upper portion 50 remains above the dew point of the condensate water vapor in the hot combustion gases. Thus a temperature sensor 114 may be placed in the water side 26 right below the inner jacket 30 as shown in FIGS. 3 and 4.

The temperature sensor 114 may be more generally described as a sensor 114 for detecting a parameter related to possible condensation of combustion gases within the heating apparatus 10, the sensor 114 providing an input to the control system 76.

The unique operating scenarios which are provided by the use of the dual blower assemblies described herein, provide a unique means for addressing condensation problems. As will be understood by those skilled in the art, the dew point of the water vapor contained in the hot combustion gases within combustion chamber 32 can be modified by adding increased amounts of air to be mixed with the hot combustion gases within the combustion chamber 32. This addition of supplemental air without accompanying fuel results in an overall drier gas mixture thus having a lower dew point.

Because the heating apparatus 10 has the advantage of having two blower assemblies present and having control over the fuel air mixture provided from each blower, the control system 76 can instruct one of the blowers to provide air without fuel while the fuel air mixture being burned comes from the other blower assembly.

This is particularly significant at operating conditions within the lower portion of the range over which the heating apparatus 10 operates. It is at low load operating conditions where condensation problems typically occur. Thus, for example, if while operating based upon fuel and air mixture coming from the first blower assembly 52, the control system 76 detects an impending condensation problem due to the temperature at sensor 114 dropping below a predetermined condensation point of the combustion gases, the control system 76 can direct the second blower assembly 54 to provide supplemental air without fuel to the burner assembly 42 thus lowering the dew point of the combustion gases within combustion chamber 32 and avoiding the creation of condensation within the primary heat exchanger 28.

Similarly, it is also possible for the first blower assembly 52 to be the source of supplemental air when the primary fuel and air load is coming from the secondary blower assembly 54. In the context of the supplemental air just described, the blower assembly which is being tapped for that supplemental air may be generally referred to as a supplemental blower.

It is also noted however that even if the primary heat exchanger 28 is intended to be non-condensing, the inner jacket 30 can be made of stainless steel if desired. If such a stainless steel inner jacket 30 is provided, then it is not necessary to provide the supplemental air feature just described.

Methods of Operation

A typical operating scenario for the water heating apparatus 10 is as follows. This scenario begins with the assumption that the water heating apparatus 10 is idle, with its control system on but with the burner assembly 32 off.

Upon receiving a call for heat from the control system 76, the control system 76 will first check the apparatus 10 for various safety preconditions such as a switch indicating that the check valve 104 is in its closed position, and the various temperature sensors being in a proper range indicating that there is no flame, no backflow, etc.

The control system 76 will then engage the blowers in both the low range blower assembly 52 and the high range blower assembly 54. The control system 76 will run through a trial for ignition routine including the following:

1. Confirm the check valve 104 has opened when the blower fan 56 comes on.
2. Confirm that the blower fan 66 of high range blower assembly 54 is on at a minimal speed, for example 1250 rpm, to prevent any backflow through the high range blower assembly 54.
3. An air pressure switch should detect a pressure differential across the large blower 54 providing further confirmation that the large blower 54 is on.
4. The various flame and temperature sensors should confirm that there is no flame in the combustion chamber 32 and no heat being produced.

Once the trial for ignition routine confirms that all systems are go for ignition, the controller 76 will run through a purge gas routine to provide fuel to the low range blower assembly 52 and an ignition signal will be sent to direct spark ignition element 98 to light the flame of fuel and gas exiting from the first zone 82 of blower assembly 42. A flame sensor will confirm ignition.

Then, depending upon the amount of heat being called for by the system the output of the low range blower assembly 52 will be increased as needed. If the call for heat is relatively low and the demand can be met by the low range blower 52 alone, then the blower 56 of low range blower assembly 52 will increase in speed to a level sufficient to meet the heat demand, and the blower 66 of high range blower assembly 54 will continue to operate only at a minimal speed to prevent backflow and no fuel will be provided to the burner assembly 42 from the high range blower assembly 54.

On the other hand, if the heat demand is high the control system 76 can bring on the high range blower assembly 54 to provide additional fuel and air to the burner assembly 42 through the second zone 84 of burner assembly 42 as needed.

Throughout the operation of the heating apparatus 10, the control system 76 will continuously monitor the various safety systems for malfunction. Typical malfunctions could for example be a restriction in the flue causing excessive back pressure on the heating apparatus 10 potentially causing overheating and backflow; failure of check valve 104 potentially causing backflow; loss of a blower fan motor, or the like. Upon detection of any malfunction the control system 76 can shut down the heating apparatus 10 by de-energizing the gas valves 64 and 74 thus preventing the flow of fuel to the burner assembly 42.

The control system 76 also continuously monitors various other operating parameters of the heating apparatus 10. Water temperature into inlet 12 is monitored by temperature sensor 116. Water temperature out from outlet 14 is monitored by temperature sensor 118. Flame sensor 120 detects whether there is flame in combustion chamber 32. An exhaust flue temperature sensor 122 senses the temperature of exhaust gases going out flue 46; that for example can be used to detect if the apparatus 10 is being fired without sufficient water flow therethrough.

One issue which must be dealt with in the heating apparatus 10 utilizing the two blower assemblies 52 and 54 is how to deal with providing for heat demands slightly in excess of that which can be provided by the low range blower assembly 52. For example, if the low range blower assembly can only operate at heat inputs between 80,000 BTU/hr and 400,000 BTU/hr and if the high range blower assembly 54 can only operate between 400,000 BTU/hr and 2,000,000 BTU/hr, then no combination of those two blower assemblies can provide exact heat demands in the range of 400,000 to 480,000 BTU/hr. This transition zone can be dealt with in several ways.

One way to deal with the transition zone is to select the blower assemblies 52 and 54 so that they have an overlap in capability at least equal to the minimum operating capacity of the low range blower assembly 52. Thus if the low range blower assembly 52 is selected so that it can operate between 80,000 and BTU/hr and if the high range blower assembly 54 can operate between 400,000 BTU/hr and 2,000,000 BTU/hr, then the low range blower assembly 52 can provide for heat demands from 80,000 to 480,000 BTU/hr, and upon a heat demand in excess of 480,000 BTU/hr, the high range blower assembly 54 can be brought on at 400,000 BTU/hr and the low range blower assembly 52 can be throttled back to provide the remainder of the necessary heat input. Of course the overlap can be greater than that just described and the low range and the high range blower assemblies 52 and 54 can be brought on in any suitable combination to provide for the necessary heat demand.

Of course the overlap of operating ranges between the low range blower assembly 52 and the high range blower assembly 54 can be provided in any manner. For example, the high range blower assembly 54 could be selected so that it was capable of operating somewhat below the nominal low end of its operating range.

Additionally, if the selected low range and high range blower assemblies 52 and 54 are such that there is not sufficient overlap in their operating ranges to allow provision of every single point of heat demand, thus resulting in a small gap in the available heat demands, the control system can be operated in such a fashion as to minimize the cycling on and off of the heating apparatus 10. For example, an operating routine can be used like that described in U.S. patent application Ser. No. 12/112,179 of Paine filed Apr. 30, 2008, and assigned to the assignee of the present invention, the details of which are incorporated herein by reference.

At maximum operating conditions, it is noted that even with both the low range blower assembly 52 and high range blower assembly 54 operating at maximum output, it is generally not expected that the combined output would reach a total of the maximum individual outputs of those blower assemblies. That is, in the example given it is not expected that the low range blower assembly 52 would be providing 400,000 BTU/hr and the high range blower assembly 54 would be providing 2,000,000 BTU/hr for a total of 2,400,000 BTU/hr. The reason is that at maximum operating capacities the back pressures within the system are such that neither the low range or high range blower assembly would be able to reach its maximum operating condition. Thus it is expected that at maximum operating conditions the combined output of the two blower assemblies will correspond to a heater input of approximately the 2,000,000 BTU/hr which is desired for the example given.

It is also noted that for fuel efficiency reasons it is preferable at maximum operating conditions to be providing fuel through both the low range blower assembly 52 and the high range blower assembly 54. Although it is conceivable to provide the maximum desired input of 2,000,000 BTU/hr by simply operating the high range blower assembly 54 at its maximum output, it must be remembered that in order to prevent backflow through the smaller low range blower assembly 52, the blower 56 will typically remain in operation thus providing some air flow without fuel. That air flow without fuel in effect cools the combustion gases, and thus reduces operating efficiency. Accordingly, the maximum operating efficiency occurs when both blower assemblies 52 and 54 are operating to provide fuel and combustion air to the burner assembly 42.

During that operation it will be appreciated that in order to avoid backflow into either blower assembly, the pressures in each of the inner zones 82 and 84 of burner assembly 42 must be greater than the pressure within the combustion chamber 32.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are embodied with the scope and spirit of the present invention as defined by the following claims.

What is claimed is:

1. A water heating apparatus, comprising:
   a combustion chamber;
   a burner assembly located within the combustion chamber;
   a variable flow premix low range blower assembly communicated with the burner assembly for supplying premixed fuel and air to the burner assembly, the low range blower assembly being operable over a low flow rate range extending from a low range low end to a low range high end;
   a variable flow premix high range blower assembly communicated with the burner assembly for supplying premixed fuel and air to the burner assembly, the high range blower assembly being operable over a high flow rate range extending from a high range low end to a high range high end, wherein the high range high end is greater than the low range high end; and
   a control system operably associated with the low range blower assembly and the high range blower assembly to selectively operate one or both of the blower assemblies as needed in response to heat demand on the water heating apparatus.

2. The apparatus of claim 1, wherein:
   the high range high end is at least 25 times the low range low end.

3. The apparatus of claim 2, wherein:
   the low range high end is at least 5 times the low range low end, and the high range high end is at least 5 times the low range high end.

4. The apparatus of claim 1, wherein:
   the high range blower assembly includes one and only one blower.

5. The apparatus of claim 1, wherein:
   the high range low end is substantially equal to the low range high end, so that an overall turndown ratio for the water heating apparatus is at least equal to the product of a low range turndown ratio of the low range blower assembly multiplied times a high range turndown ratio of the high range blower assembly.

6. The apparatus of claim 1, wherein:
   the high range low end is no greater than the low range high end; and
   the control system is operable to supply premixed fuel and air to the burner assembly in a continuously variable combined flow rate range extending from the low range low end to at least the high range high end.

7. The apparatus of claim 1, wherein:
   the burner assembly includes a first plenum communicated with a first foraminous burner wall portion, and a second plenum communicated with a second foraminous burner wall portion, the first and second foraminous burner wall portions being sufficiently close to each other so that flame from the first foraminous burner wall portion will ignite fuel-air mixture exiting the second foraminous burner wall portion;
   the low range blower assembly is connected to the first plenum to supply premixed fuel and air to the first plenum; and
   the high range blower assembly is connected to the second plenum to supply premixed fuel and air to the second plenum.

8. The apparatus of claim 7, further comprising:
   a direct spark ignition element adjacent the first foraminous burner wall portion, for igniting fuel and air from the first plenum.

9. The apparatus of claim 7, wherein:
   the first foraminous burner wall portion includes a first cylindrical foraminous burner wall; and
   the second foraminous burner wall portion includes a second cylindrical foraminous burner wall and a flat foraminous burner wall spanning one end of the second cylindrical foraminous burner wall.

10. The apparatus of claim 7, wherein:
    a surface area ratio of the second foraminous burner wall portion to the first foraminous burner wall portion is substantially equal to a ratio of the high range high end to the low range high end, so that with both blower assemblies operating at maximum output a surface heat loading per unit area for the first and second foraminous burner wall portions is substantially equal.

11. The apparatus of claim 1, wherein:
    the control system is operatively associated with at least one of the low and high range blower assemblies to selectively provide supplemental air without fuel from the at least one blower assembly to the burner assembly.

12. The apparatus of claim 11, further comprising:
    a sensor for detecting a parameter related to possible condensation of combustion gases within the heating apparatus, the sensor providing an input to the control system; and
    the control system is operative to provide the supplemental air without fuel from the at least one blower assembly to the burner assembly in response to the input from the sensor.

13. The apparatus of claim 1, wherein the heating apparatus has a heat input of at least 2,000,000 BTU/hr.

14. The apparatus of claim 1, further comprising:
a check valve between the low range blower assembly and the burner assembly for preventing backflow from the burner assembly into the low range blower assembly.

15. The apparatus of claim 1, further comprising:
a temperature sensor between the low range blower assembly and the burner assembly for detecting backflow from the burner assembly into the low range blower assembly; and
wherein the control system is communicated with the temperature sensor and is operable to shut down the heating apparatus in response to a rise in temperature detected by the temperature sensor.

16. The apparatus of claim 1, further comprising:
a temperature sensor between the high range blower assembly and the burner assembly for detecting backflow from the burner assembly into the high range blower assembly; and
wherein the control system is communicated with the temperature sensor and is operable to shut down the heating apparatus in response to a rise in temperature detected by the temperature sensor.

17. The apparatus of claim 1, further comprising:
at least one blower fan speed sensor operably associated with at least one of the blower assemblies; and
wherein the control system receives at least one blower fan speed signal from the at least one blower fan speed sensor, and the control system is operable to compare sensed blower fan speed to a programmed blower fan speed and to shut down the heating apparatus in the event of an unprogrammed change in sensed blower fan speed.

18. The apparatus of claim 1, wherein:
the burner assembly is cylindrical in shape and includes first and second internal cylindrical zones divided by an internal wall, the first zone being communicated with the low range blower assembly and the second zone being communicated with the high range blower assembly.

19. The apparatus of claim 18, further comprising:
a cylindrical heat exchanger wall defining the combustion chamber inside the cylindrical heat exchanger wall, the cylindrical heat exchanger wall including a first smaller diameter portion within which the first zone of the burner assembly is located and a second larger diameter portion within which the second zone of the burner assembly is located, so that a flame from the first zone fed by the low range blower assembly has a shorter standoff from the cylindrical heat exchanger wall than does a flame from the second zone fed by the high range blower assembly.

20. A water heating apparatus, comprising:
a combustion zone;
a burner apparatus extending into the combustion zone;
a first variable flow premix blower assembly for supplying premixed fuel and air to the burner apparatus, the first blower assembly having a first blower flow rate range extending from a first range low end to a first range high end so that the first blower assembly has a first turndown ratio at least equal to the first range high end divided by the first range low end;
a second variable flow premix blower assembly for supplying premixed fuel and air to the burner apparatus, the second blower assembly having a second flow rate range extending from a second range low end to a second range high end so that the second blower assembly has a second turndown ratio equal to the second range high end divided by the second range low end, the second range low end being substantially equal to or less than the first range high end so that there is no substantial gap between the first and second flow rate ranges; and
a control system operably associated with the first and second blower assemblies to selectively operate one or both of the blower assemblies as needed in response to heat demand on the heating apparatus, wherein the first and second blower assemblies together provide a continuous combined turndown ratio at least as great as the sum of the first and second turndown ratios.

21. The apparatus of claim 20, wherein the second range low end is substantially equal to the first range high end, and the continuous combined turndown ratio is at least as great as the product of the first turndown ratio multiplied times the second turndown ratio.

22. The apparatus of claim 20, wherein the first and second flow rate ranges are substantially equal and the continuous combined turndown ratio is equal to the sum of the first and second turndown ratios.

23. The apparatus of claim 20, wherein the first and second flow rate ranges partially overlap each other and the continuous combined turndown ratio is less than the product of the first turndown ratio multiplied times the second turndown ratio.

24. The apparatus of claim 20, wherein:
the first and second flow rate ranges are low and high flow rate ranges, respectively, the second range low end being higher than the first range low end, and the second range high end being higher than the first range high end.

25. A method of operating a water heating apparatus, the method comprising:
(a) supplying premixed fuel and air to a burner assembly of the apparatus via a low range blower assembly at a flow rate within a low flow rate range;
(b) supplying additional premixed fuel and air to the burner assembly via a high range blower assembly at a flow rate within a high flow rate range, the high range extending higher than the low range and there being no substantial gap between the low range and the high range; and
(c) via an automated control system, selectively operating the blower assemblies as needed in response to heat demand on the water heating apparatus so that premixed fuel and air is supplied to the burner assembly over a substantially continuously variable combined flow rate range extending from a low end of the low flow rate range to at least a high end of the high flow rate range.

26. The method of claim 25, further comprising:
prior to step (b), igniting the fuel and air from the low range blower assembly as the fuel and air exits the burner assembly thereby creating a first flame; and
during step (b), igniting the fuel and air from the high range blower assembly with the first flame.

27. The method of claim 26, wherein:
the step of igniting the fuel and air from the low range blower assembly comprises igniting with a direct spark ignition device.

28. The method of claim 25, wherein in step (c) the continuously variable combined flow rate range provides a turndown ratio of at least 25 to 1.

29. The method of claim 28, wherein in step (c) the continuously variable combined flow rate range corresponds to a water heating apparatus input range from at most 80,000 BTU/hr to at least 2,000,000 BTU/hr.

30. The method of claim 25, further comprising:
sensing a parameter related to possible condensation of combustion gases within the heating apparatus; and
via the automated control system in response to the sensed parameter, selectively operating one of the blower assemblies to provide supplemental air without fuel to the burner assembly to raise the condensation point of the combustion gases within the heating apparatus.

31. The method of claim 25, further comprising:
preventing backflow from the burner assembly to the low range blower assembly.

32. The method of claim 31, wherein the preventing step comprises closing a mechanical check valve between the low range blower assembly and the burner assembly.

33. The method of claim 31, wherein the preventing step comprises:
detecting a temperature rise between the low range blower assembly and the burner assembly; and
shutting down the heating apparatus via the automated control system in response to the detected temperature rise.

34. The method of claim 31, wherein the preventing step comprises:
sensing a blower fan speed of the low range blower assembly; and
shutting down the heating apparatus via the automated control system in response to a determination that the sensed blower fan speed is different from an expected blower fan speed.

\* \* \* \* \*